US012261288B2

(12) United States Patent
Kwak et al.

(10) Patent No.: US 12,261,288 B2
(45) Date of Patent: Mar. 25, 2025

(54) METHOD FOR PRODUCING POSITIVE ELECTRODE ACTIVE MATERIAL FOR LITHIUM SECONDARY BATTERY AND POSITIVE ELECTRODE ACTIVE MATERIAL FOR LITHIUM SECONDARY BATTERY PRODUCED THEREBY

(71) Applicant: LG Energy Solution, Ltd., Seoul (KR)

(72) Inventors: Min Kwak, Daejeon (KR); Tae Gon Kim, Daejeon (KR); Byung Chun Park, Daejeon (KR); Bo Ram Lee, Daejeon (KR); Tae Gu Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 119 days.

(21) Appl. No.: 17/788,897

(22) PCT Filed: Jan. 29, 2021

(86) PCT No.: PCT/KR2021/001212
§ 371 (c)(1),
(2) Date: Jun. 24, 2022

(87) PCT Pub. No.: WO2021/154029
PCT Pub. Date: Aug. 5, 2021

(65) Prior Publication Data
US 2023/0074059 A1 Mar. 9, 2023

(30) Foreign Application Priority Data
Jan. 30, 2020 (KR) .................. 10-2020-0011338

(51) Int. Cl.
*H01M 4/505* (2010.01)
*C01G 53/50* (2025.01)
(Continued)

(52) U.S. Cl.
CPC ............ *H01M 4/366* (2013.01); *C01G 53/50* (2013.01); *H01B 1/08* (2013.01); *H01M 4/505* (2013.01);
(Continued)

(58) Field of Classification Search
CPC .. H01B 1/08; C09C 1/48; C01B 32/00; C01B 32/15; H01M 4/366; H01M 4/505; H01M 4/525; H01M 4/625
See application file for complete search history.

(56) References Cited

U.S. PATENT DOCUMENTS 5,538,814 A   7/1996   Kamauchi et al.
5,618,640 A   4/1997   Idota et al.
(Continued)

FOREIGN PATENT DOCUMENTS

CN   1949561 A   4/2007
CN   104604002 A   5/2015
(Continued)

OTHER PUBLICATIONS

Hess et al "Chapter 3 Microstructure, Morphology and General Physical Properties", Carbon Black: Science and Technology, Second Edition 2018.*
(Continued)

*Primary Examiner* — Mark Kopec
(74) *Attorney, Agent, or Firm* — Lerner David LLP

(57) ABSTRACT

A positive electrode active material, a method for producing the same, and a positive electrode and a lithium secondary battery in including the same are disclosed herein. In some embodiments, a method of producing a positive electrode active material includes mixing a lithium transition metal oxide and a carbon-based material having a hollow structure to form a mixture, and mechanically treating the mixture to form a carbon coating layer on the surface of the lithium
(Continued)

transition metal oxide, wherein the carbon-based material has a chain shape, and has a specific surface area of 500 m$^2$/g or greater, a graphitization degree ($I_D/I_G$) of 1.0 or higher, and a dibutylphthalate (DBP) absorption of 300 mL/100 g or greater.

9 Claims, 4 Drawing Sheets

(51) Int. Cl.
  *H01B 1/08*      (2006.01)
  *H01M 4/36*      (2006.01)
  *H01M 4/525*     (2010.01)
  *H01M 4/62*      (2006.01)
  *H01M 4/02*      (2006.01)
  *H01M 10/052*    (2010.01)

(52) U.S. Cl.
  CPC .......... *H01M 4/525* (2013.01); *H01M 4/625* (2013.01); *C01P 2002/50* (2013.01); *C01P 2002/74* (2013.01); *C01P 2004/03* (2013.01); *C01P 2004/50* (2013.01); *C01P 2004/64* (2013.01); *C01P 2004/80* (2013.01); *C01P 2006/12* (2013.01); *C01P 2006/19* (2013.01); *C01P 2006/40* (2013.01); *H01M 2004/021* (2013.01); *H01M 2004/028* (2013.01); *H01M 10/052* (2013.01)

(56) References Cited

U.S. PATENT DOCUMENTS

| | | | |
|---|---|---|---|
| 5,789,114 A | | 8/1998 | Adachi et al. |
| 6,077,496 A | | 6/2000 | Ito et al. |
| 6,114,065 A | | 9/2000 | Inoue et al. |
| 6,476,151 B1 | * | 11/2002 | Araki ................ C08F 214/262 526/79 |
| 2005/0153205 A1 | | 7/2005 | Hisashi et al. |
| 2011/0177391 A1 | | 7/2011 | Ookita et al. |
| 2013/0260252 A1 | | 10/2013 | Sheem et al. |
| 2014/0038053 A1 | | 2/2014 | Endo et al. |
| 2014/0255786 A1 | | 9/2014 | Oh et al. |
| 2014/0315089 A1 | * | 10/2014 | Yu ........................ H01M 4/525 429/223 |
| 2015/0037680 A1 | | 2/2015 | Park et al. |
| 2015/0188123 A1 | | 7/2015 | Mizuno |
| 2016/0204419 A1 | | 7/2016 | Yoshida et al. |
| 2019/0221839 A1 | | 7/2019 | Inoue et al. |
| 2021/0013511 A1 | | 1/2021 | Kim et al. |
| 2021/0133511 A1 | * | 5/2021 | Bian ..................... G06F 16/51 |

FOREIGN PATENT DOCUMENTS

| | | | |
|---|---|---|---|
| EP | 3761410 A1 | 1/2021 | |
| JP | 862295353 A | 12/1987 | |
| JP | H09092265 A | 4/1997 | |
| JP | H10312811 A | 11/1998 | |
| JP | 2003308845 A | 10/2003 | |
| JP | 2009117241 A | 5/2009 | |
| JP | 2012204332 A | 10/2012 | |
| JP | 2014035859 A | 2/2014 | |
| JP | 5601792 B2 | 10/2014 | |
| JP | 5821722 B2 | 11/2015 | |
| JP | 2016186952 A | 10/2016 | |
| KR | 20130109785 A | 10/2013 | |
| KR | 20140111516 A | 9/2014 | |
| KR | 20140126585 A | 10/2014 | |
| KR | 20150017012 A | 2/2015 | |
| KR | 101666871 B1 | 10/2016 | |
| KR | 20180071106 A | 6/2018 | |
| KR | 20190117279 A | 10/2019 | |
| WO | 2019194613 A1 | 10/2019 | |
| WO | 2019244933 A1 | 12/2019 | |

OTHER PUBLICATIONS

Ni et al "Carbon coated lithium cobalt phosphate for Li-ion batteries: Comparison of three coating techniques", Journal of Power Sources 221 (2013) 35-41.*
Bauer et al "Influence of dry mixing and distribution of conductive additives in cathodes for lithium ion batteries", Journal of Power Sources 288 (2015) 359-367.*
English language translation of PCT/ISA/237 (mailed Apr. 28, 2021).*
English language machine translation of JP 2003308845 (pub date Oct. 2003).*
Jozsef Speder et al., "The colloidal toolbox approach for fuel cell catalysts: Systematic study of perfluorosulfonateionomer impregnation and Pt loading", Catalysis Today, Mar. 2016, vol. 262, pp. 82-89.
International Search Report for PCT/KR2021/001212 dated Apr. 28, 2021. 3 pgs.
Extended European Search Report including Written Opinion for Application No. 21747957.5 dated May 10, 2023, pp. 1-7.
Te-Kang Chen, et al.,, Maleic-anhydride-grafted ketjen black as the alternative carbon additive for LiFePO4 cathode, Electrochimica Acta, vol. 107, Sep. 2013, pp. 503-508.

* cited by examiner

METHOD FOR PRODUCING POSITIVE ELECTRODE ACTIVE MATERIAL FOR LITHIUM SECONDARY BATTERY AND POSITIVE ELECTRODE ACTIVE MATERIAL FOR LITHIUM SECONDARY BATTERY PRODUCED THEREBY

CROSS-REFERENCE TO RELATED APPLICATIONS

This application is a national phase entry under 35 U.S.C. § 371 of International Application No. PCT/KR2021/001212, filed on Jan. 29, 2021, which claims priority from Korean Patent Application No. 10-2020-0011338, filed on Jan. 30, 2020, in the Korean Intellectual Property Office, the disclosures of which are incorporated by reference herein.

TECHNICAL FIELD

The present invention relates to a method for producing a positive electrode active material for a lithium secondary battery, a positive electrode active material produced by the production method, a positive electrode for a lithium secondary battery including the positive electrode active material, and a lithium secondary battery.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, a lithium transition metal oxide is used. Among such lithium transition metal oxides, a lithium-cobalt oxide, such as $LiCoO_2$, which has a high functional voltage and excellent capacity properties has been mainly used. However, $LiCoO_2$ has very poor in thermal properties due to the destabilization of a crystal structure according to de-lithium, and is also expensive. Therefore, $LiCoO_2$ has a limitation in being used as a power source in a field such as an electric vehicle or the like in a large amount.

As a material to replace $LiCoO_2$, a lithium manganese composite metal oxide ($LiMnO_2$. $LiMn_2O_4$, and the like), a lithium iron phosphate compound ($LiFePO_4$ and the like), or a lithium nickel composite metal oxide ($LiNiO_2$ and the like) and the like has been developed. Among the above materials, research and development has been actively conducted on a lithium nickel composite metal oxide which has a high reversible capacity of about 200 mAh/g, thereby easily implementing a high capacity battery. However, when compared with $LiCoO_2$, $LiNiO_2$ has a lower thermal stability, and has a problem in that when an internal short circuit occurs due to external pressure or the like in a charged state, a positive electrode active material itself is decomposed, causing the rupture and ignition of a battery. Accordingly, as a method for improving the thermal stability of $LiNiO_2$, which is low, while maintaining the excellent reversible capacity thereof, $LiNi_{1-\alpha}Co_\alpha O_2 (\alpha=0.1\sim 0.3)$, in which a part of nickel is substituted with cobalt, or a lithium-nickel-cobalt metal oxide, in which a part of nickel is substituted with Mn, Co, or Al, has been developed.

However, as for the lithium-nickel-cobalt metal oxide, due to the sharp increase in cobalt price, Co-less positive electrode material not containing cobalt, or Ni-rich positive electrode material containing Ni in excess has been actively studied in terms of cost and energy density.

Meanwhile, compared to a Co-rich composition which has been typically used and in which cobalt is used in excess, the Co-less positive electrode material or the Ni-rich positive electrode material has a problem of having a low electrical conductivity of positive electrode active material and being vulnerable to moisture. In order to solve the above problem, there has been an attempt to form a carbon coating layer on the surface of the above-described positive electrode material using a pitch and the like. However, in the case of a carbon coating layer, there is a disadvantage in that a high-temperature heat treatment for carbonization should be accompanied, and when the high-temperature heat treatment is performed, a carbon element on a surface reacts with oxygen on the surface of a positive electrode material and reduced, which causes the oxidation number of the positive electrode material to greatly change, resulting in deteriorating the performance of the positive electrode material.

Therefore, there has been a demand for developing a positive electrode active material that can improve electrical conductivity and lifespan properties by forming a thin and uniform carbon coating layer on the surface of the positive electrode active material without the change in the oxidation number of the surface of a positive electrode material caused by a high-temperature heat treatment process.

DISCLOSURE OF THE INVENTION

Technical Problem

In order to solve the above problem, a first aspect of the present invention provides a method for producing a positive electrode active material, in which a lithium transition metal oxide is surface-treated in a mechanical manner with a carbon-based material of a hollow structure, thereby capable of forming a uniform carbon coating layer on the surface thereof.

A second aspect of the present invention provides a positive electrode active material produced by the above-described production method, thereby, capable of improving conductivity by having a thin and uniform carbon coating layer formed on the surface of a lithium transition metal oxide.

A third aspect of the present invention provides a positive electrode for a lithium secondary battery including the positive electrode active material.

A fourth aspect of the present invention provides a lithium secondary battery including the positive electrode.

Technical Solution

According to an aspect of the present invention, there is provided a method for producing a positive electrode active material, wherein the method includes mixing a lithium transition metal oxide and a carbon-based material of a hollow structure to form a mixture, and surface treating the mixture in a mechanical manner to form a carbon coating layer on the surface of the lithium transition metal oxide, wherein the carbon-based material of a hollow structure has a chain shape, and has a specific surface area of 500 m²/g or greater, a graphitization degree ($I_D/I_G$) of 1.0 or higher, and a DBP absorption of 300 mL/100 g or greater.

According to another aspect of the present invention, there is provided a positive electrode active material including a lithium transition metal oxide, and a carbon coating layer formed on the surface of the lithium transition metal oxide, wherein the carbon coating layer is formed on the surface of the lithium transition metal oxide, and the carbon coating layer has a thickness of 500 nm or less, and the positive electrode active material has a BET specific surface area of 0.5 m$^2$/g to 50 m$^2$/g.

According to another aspect of the present invention, there is provided a positive electrode for a lithium secondary battery including the positive electrode active material.

According to another aspect of the present invention, there is provided a lithium secondary battery including the positive electrode for a lithium secondary battery.

Advantageous Effects

According to the present invention, when forming a carbon coating layer on the surface of a lithium transition metal oxide, the carbon coating layer is formed by a physical method using a carbon-based material having a hollow structure, so that a thin and uniform carbon coating layer may be formed without a change in the oxidation number of the surface of a positive electrode material. Accordingly, the electrical conductivity of a positive electrode active material may be improved, and the gelation of a slurry when mixing a positive electrode may be prevented, and when the positive electrode active material is applied to a battery, the input/output properties, lifespan properties, and the like of the battery may be improved.

BEST MODE FOR CARRYING OUT THE INVENTION

Figure 1:
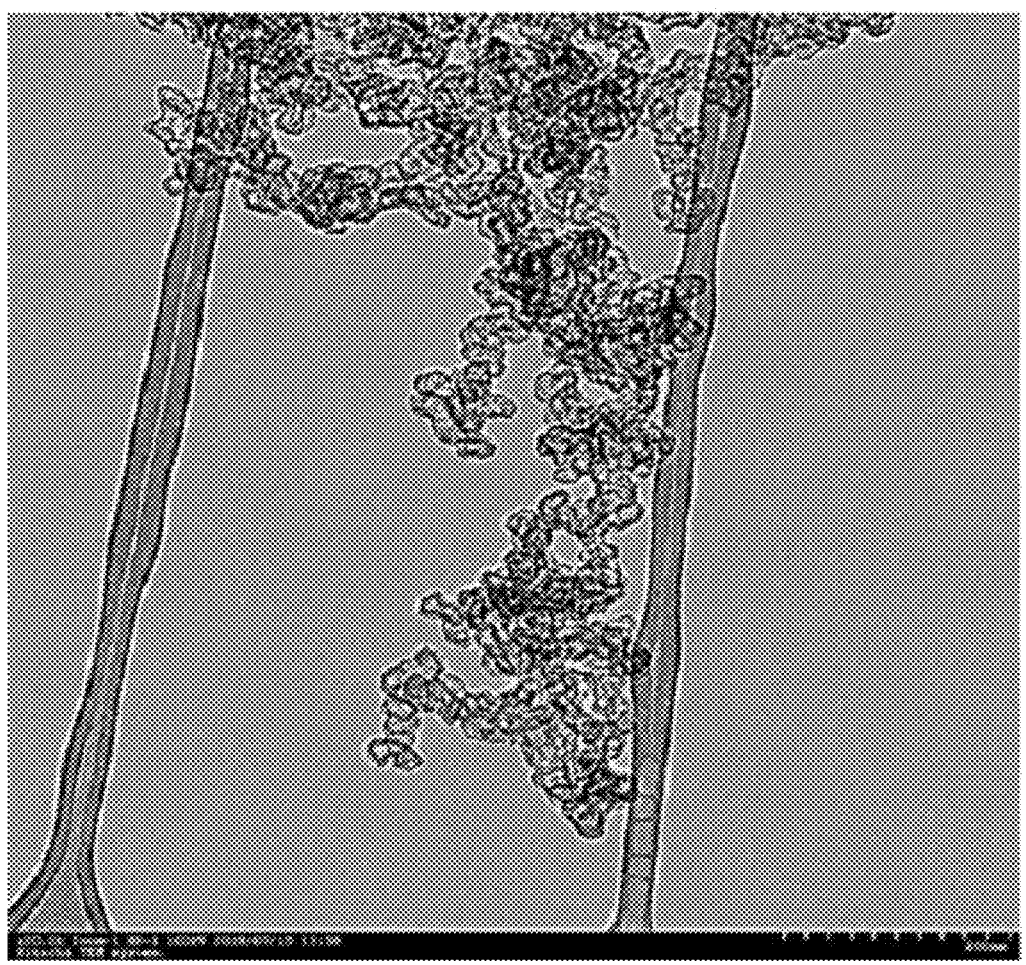
FIG. 1 is an SEM image showing a carbon-based material having a hollow structure and used in an example of the present invention.

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the entire specification, a 'primary particle' means a primary structural body of a single particle, and a 'secondary particle' means an aggregate in which primary particles are aggregated by physical or chemical bonding between the primary particles without an intentional aggregation or assembly process for primary particles constituting a secondary particle, that is, a secondary structural body.

In the entire specification, a "specific surface area" is measured by a BET method, and specifically, may be calculated from the adsorption amount of nitrogen gas under a liquid nitrogen temperature (77 K) using Belsorp-mini II of BEL Japan Co., Ltd.

In the entire specification, "dibutylphthalate (DBP) adsorption" is the measurement of a pore of a secondary particle in which primary particles of a carbon-based material are aggregated, and indicates how well the primary particles are connected in the carbon-based material. The DBP adsorption may be measured by mixing DBP, which is a plasticizer, with a predetermined amount of carbon black to measure changes in torques occurring due to the impregnation of the plasticizer. Typically, the greater the DBP absorption, the better the conductivity.

In the entire specification, a "graphitization degree" means a degree to which amorphous carbon changes partially or entirely into crystalline graphite, and may be confirmed using Raman spectroscopy. The structure of a carbon-based material may be analyzed thereby. In the Raman spectrum of a carbon-based material, a G-band is a peak indicating an sp$^2$ bond of the carbon-based material, and it indicates a carbon crystal with no structural defects. A D-band is a peak indicating an sp$^3$ bond of the carbon-based material, and it increases when an atomic bond formed by the sp$^2$ bond is broken and becomes the sp$^3$ bond. The above D band increases when disorders or defects present in the carbon-based material are generated, so that it is possible to quantitatively evaluate the degree of disorder or defect generation by calculating the ratio ($I_D/I_G$) of the maximum peak intensity ($I_D$) of the D band to the maximum peak intensity ($I_G$) of the G band.

Method for Preparing Positive Electrode Active Material

The present inventors have found that, when forming a carbon-based coating layer on a lithium transition metal oxide, if the carbon-based coating layer is formed by a mechanofusion method using a carbon-based material having a specific structure, a uniform and thin carbon coating layer may be formed on the surface thereof without the change in the structure of the lithium transition metal oxide, and have completed the present invention.

Specifically, a method for producing a positive electrode active material according to the present invention includes mixing a lithium transition metal oxide and a carbon-based material of a hollow structure to form a mixture, and treating the mixture in a mechanical manner to form a carbon coating layer on the surface of the lithium transition metal oxide, wherein the carbon-based material of a hollow structure is in a chain shape, and has a specific surface area of 500 m$^2$/g or greater, a graphitization degree ($I_D/I_G$) of 1.0 or higher, and a DBP absorption of 300 mL/100 g or greater.

Hereinafter, the method for producing a positive electrode active material according to the present invention will be described in more detail.

First, in order to produce a positive electrode active material according to the present invention, a lithium transition metal oxide is prepared.

For example, the lithium transition metal oxide may have a crystal grain having the size of 50 nm to 4,000 nm, preferably 50 nm to 2,000 nm. For example, the lithium transition metal oxide may have a secondary particle form in which primary particles are aggregated, or have a single particle form made of a primary particle alone. For example, when the lithium transition metal oxide is formed as a secondary particle in which primary particles are aggregated, the energy density per volume of an electrode may be increased, and the contact area between the lithium transition metal oxide and an electrolyte solution is large and the travel distance of lithium ions in the lithium transition metal oxide is short, so that high capacity and high power properties may be easily exhibited. For example, when the lithium transition metal oxide is formed in the form of a single particle, roll-pressing density is increased, so that the structural stability of a battery may be improved.

Any lithium transition metal oxide typically used as a positive electrode active material may be applied as the lithium transition metal oxide without limitation as long as the intercalation or deintercalation of lithium ions easily occurs during charging/discharging. For example, the lithium transition metal oxide may be a layered compound such as a lithium cobalt oxide ($LiCoO_2$) and a lithium nickel oxide ($LiNiO_2$), or a compound substituted with one or more transition metals; a lithium manganese oxide such as $Li_{1+y1}Mn_{2-y1}O_4$ ($0 \leq y \leq 10.33$), $LiMnO_3$, $LiMn_2O_3$, and $LiMnO_2$; lithium copper oxide ($Li_2CuO_2$); a vanadium oxide such as $LiV_3O_8$, $LiFe_3O_4$, $V_2O_5$, and $Cu_2V_2O_7$; a Ni-site type lithium nickel oxide represented by the formula $LiNi_{1-y2}M_{y2}O_2$ (wherein M is one or more selected from the group consisting of Co, Mn, Al, Cu, Fe, Mg, B, and Ga, and $0.01 \leq y \leq 20.3$); a lithium manganese composite oxide represented by the formula $LiMn_{2-y3}Mn_{2-y3}O_2$ (wherein, M is one or more selected from the group consisting of Co, Ni, Fe, Cr, Zn, and Ta, and $0.01 \leq y \leq 30.1$), or by the formula $Li_2Mn_3MO_8$ (wherein M is one or more selected from the group consisting of Fe, Co, Ni, Cu, and Zn); $LiMn_2O_4$ having a part of Li in the formula substituted with an alkaline earth metal ion, and the like, but is not limited thereto.

Next, the lithium transition metal oxide and a carbon-based material of a hollow structure are mixed to form a mixture.

The carbon-based material has a chain shape, and may be in the form of a secondary particle in which primary particles are aggregated. As the carbon-based material is in the form of a secondary particle in which primary particles are aggregated, pores may be included inside the carbon-based material.

The size of a primary particle of the carbon-based material may be 50 nm or less, preferably 5 nm to 50 nm. When the size of a primary particle of the carbon-based material satisfies the above range, it may be advantageous in forming a uniform coating layer. In addition, since the carbon-based material has a chain shape, even when the size of a primary particle of the carbon-based material is as small as the above-described range, a carbon coating layer may be uniformly formed on the surface of the lithium transition metal oxide.

For example, when the size of a primary particle of the carbon-based material is greater than 50 nm, there may be a problem in that a coating layer entirely uniform may not be formed due to the occurrence of partial aggregation of carbon.

According to the present invention, the carbon-based material of a hollow structure may have a specific surface area of 500 $m^2/g$ or greater, preferably 500 $m^2/g$ to 2,500 $m^2/g$, and at this time, the graphitization degree thereof is 1.0 or higher, preferably 1.0 to 2.0, and the DBP absorption thereof is 300 mL/100 g or greater, preferably 300 mL/100 g to 2,000 mL/100 g, most preferably 300 mL/100 g to 1,000 mL/100 g.

When the carbon-based material of a hollow structure has a BET specific surface area and a graphitization degree in the above ranges, it means that the carbon-based material of a hollow structure has low crystallinity. For example, when the BET specific surface area is less than the above range, or the graphitization degree is less than the above range, the carbon-based material may have a dense structure.

Specifically, as shown in FIG. 1, the carbon-based material of a hollow structure according to the present invention has a chain shape, and exhibits low crystallinity. In this case, since structural collapse occurs by force applied from the outside, when a carbon coating layer is formed using the carbon-based material, the carbon-based material is crushed and brought into close contact with the surface of the lithium transition metal oxide due to the structural collapse of the carbon-based material by force applied from the outside, so that a carbon coating layer may be formed to a uniform thickness on the surface of a secondary particle. Particularly, when the lithium transition metal oxide has the form of a secondary particle in which primary particles are aggregated, the carbon coating layer may be uniformly formed even at the boundary between primary particles. As a result, the conductivity of a positive electrode active material may be improved, and the BET specific surface area of a finally produced positive electrode active material may also be maintained low, so that side reactions and the like with an electrolyte solution due to an increase in the BET specific surface area may be prevented in advance.

Figure 2:
FIG. 2 is an SEM image showing a carbon-based material having a dense structure and used in a comparative example of the present invention.

For example, a carbon-based material having the graphitization degree of less than 1.0 has high crystallinity as shown in FIG. 2, and thus, is not subjected to structural collapse. Therefore, even when force is applied from the outside, the carbon-based material is coated while maintaining its crystallinity on the surface of a lithium transition metal oxide without the structural collapse of the carbon-based material, so that a BET specific surface area may be increased. In addition, since the carbon-based material forms a carbon-based coating layer in the form of being stuck to the surface of the lithium transition metal oxide without the structural collapse, it is not easy to form a uniform carbon coating layer on the surface of a positive electrode active material. Particularly, when the lithium transition metal oxide has the form of a secondary particle in which primary particles are aggregated, it is difficult to form a carbon coating layer at the boundary between the primary particles of the lithium transition metal oxide, so that it is less easy to form a uniform carbon coating layer.

In addition, the carbon-based material according to the present invention has a DBP absorption of 300 mL/100 g or greater, preferably 300 mL/100 g to 2,000 mL/100 g.

In the present invention, the "dibutylphthalate (DBP) adsorption" is the measurement of a pore of the carbon-based material in the form of a secondary particle in which primary particles are aggregated, and indicates how well the primary particles are connected in the carbon-based material. Typically, the larger the DBP absorption, the better connected the primary particles are in a carbon-based material, so that improved conductivity may be exhibited.

For example, when the DBP absorption is less than the above range, primary particles in a carbon-based material are not well connected, so that even when a carbon coating layer is formed by the carbon-based material, improved conductivity is not easily exhibited.

The mixing of the lithium transition metal oxide and the carbon-based material may be performed by mixing the carbon-based material in an amount of 0.1 to 1.5 parts by weight, preferably 0.1 to 1 part by weight based on 100 parts by weight of the lithium transition metal oxide. When the mixing is performed in the above range, it is possible to form a uniform carbon coating layer on the entire surface of the lithium transition metal oxide. On the other hand, when the mixing amount of the carbon-based material is greater than the above range, an excessively think carbon coating layer is formed, and may rather act as resistance which hinders the diffusion of lithium ions, so that when applied to a battery, the input/output properties of the battery may be degraded.

Next, a carbon coating layer is formed on the surface of the lithium transition metal oxide by surface treating the mixture in a mechanical manner.

The treating of the mixture in a mechanical manner according to the present invention may be performed by a mechanofusion method. Specifically, the mechanofusion method may be performed using a nobilta device under a dry process condition in which an additive such as a solvent, a binder, and the like is not additionally included. Specifically, the mechanofusion method may be performed while stirring a reactor at room temperature (20° C.) with a current of 3 to 15 A, a power of 0.2 to 5.5 W, and a rotational speed of 500 to 6,000 rpm based on a 0.5 L nobilta device. The mechanofusion method may have different current, power, rotational speed conditions depending on the capacity of a device. For example, if the capacity of a device is increased, power may be increased but a rotational speed may be decreased. Specifically, for example, when a nobilta device of 300 L capacity is used, the mechanofusion method may be performed while stirring at a rotational speed of 50 to 800 rpm at a power of 10 to 200 W. Since the dispersibility of particles is improved by the mechanofusion method, a carbon material is spaced at a uniform interval on the surface of a lithium transition metal oxide, so that a uniform carbon coating layer may be formed on the surface of the lithium transition metal oxide. In addition, even when the lithium transition metal oxide has the form of a secondary particle in which primary particles are aggregated, a carbon coating layer may be formed not only on the surface of the secondary particle of the lithium transition metal oxide, but also at the boundary between the primary particles.

Positive Electrode Active Material

In addition, the present invention provides a positive electrode active material produced by the above-described method. Specifically, the positive electrode active material includes a lithium transition metal oxide, and a carbon coating layer formed on the surface of the lithium transition metal oxide, wherein the carbon coating layer is formed on the surface of the lithium transition metal oxide, and the carbon coating layer has a thickness of 500 nm or less, and the positive electrode active material has a BET specific surface area of 0.5 m$^2$/g to 50 m$^2$/g.

As described above, a lithium transition metal oxide according to the present invention may have a crystal grain having a size of 50 nm to 4,000 nm, preferably 50 nm to 2,000 nm, and the lithium transition metal oxide may be in the form of a secondary particle in which primary particles are aggregated, or the lithium transition metal oxide may have a single particle form.

When the lithium transition metal oxide has a single particle form, the carbon coating layer may be coated with a uniform thickness and shape on the surface of the lithium transition metal oxide having a single particle form. In addition, when the lithium transition metal oxide has the form of a secondary particle in which primary particles are aggregated, the carbon coating layer may be uniformly formed on the surfaces of the primary particles of the lithium transition metal oxide and on the surface of the secondary particle thereof.

Preferably, the positive electrode active material according to the present invention has a BET specific surface area of 0.5 m$^2$/g to 50 m$^2$/g, preferably 2 m$^2$/g to 20 m$^2$/g, more preferably 3 m$^2$/g to 10 m$^2$/g. When the BET specific surface area is in the above-described range, the change in specific surface area due to the formation of a carbon coating layer is minimized, so that side reactions between a positive electrode active material and an electrolyte solution may be suppressed.

In addition, the positive electrode active material according to the present invention has a powder electrical conductivity of $3.7 \times 10^{-3}$ S/cm to $10.0 \times 10^{-3}$ S/cm, preferably $4.5 \times 10^{-3}$ S/cm to $10.0 \times 10^{-3}$ S/cm, which is measured after roll-pressing the positive electrode active material by applying a force of 0.1 kN to 20 kN, preferably 0.5 to 10 kN, most preferably 20 kN thereto. As described above, since the electrical conductivity of the positive electrode active material itself greatly increases due to the formation of the carbon coating layer on the surface, when the positive electrode active material is applied to a battery, the electrochemical properties of the battery, such as input and output properties, lifespan properties, and the like, may be improved.

Positive Electrode

In addition, the present invention provides a positive electrode for a lithium secondary battery, the positive electrode including a positive electrode active material produced by the method described above.

Specifically, the positive electrode includes a positive electrode current collector and a positive electrode active material layer formed on at least one surface of the positive electrode current collector and including the above-described positive electrode active material.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 to 500 µm, and microscopic irregularities may be formed on the surface of the current collector to improve the adhesion of a positive electrode active material. For example, the positive electrode current collector may be used in various forms such as a film, a sheet, a foil, a net, a porous body, a foam, and a non-woven body.

The positive electrode active material layer may include a conductive material and a binder, together with a positive electrode active material.

At this time, the positive electrode active material may be included in an amount of 80 to 99 wt %, more specifically 85 to 98 wt % based on the total weight of the positive electrode active material layer. When included in the above content range, excellent capacity properties may be exhibited.

At this time, the conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 1 to 30 wt % based on the total weight of the positive electrode active material layer.

The binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 to 30 wt % based on the total weight of the positive electrode active material layer.

The positive electrode may be manufactured according to a typical method for manufacturing a positive electrode except that the positive electrode active material described above is used. Specifically, the positive electrode may be manufactured by applying a positive electrode mixture, which is prepared by dissolving or dispersing the positive electrode active material described above and selectively, a binder and a conductive material in a solvent, on a positive electrode current collector, followed by drying and roll-pressing. At this time, the type and content of the positive electrode active material, the binder, and the conductive material are as described above.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is sufficient if the solvent may dissolve and disperse the positive electrode active material, the binder, and the conductive material in consideration of the applying thickness of a slurry and preparation yield, and thereafter, have a viscosity which may exhibit excellent thickness uniformity during application for manufacturing a positive electrode.

Also, as another method, the positive electrode may be prepared by casting the positive electrode mixture on a separate support and then laminating a film separated from the support on the positive electrode current collector.

Lithium Secondary Battery

In addition, the present invention may manufacture an electrochemical device including the positive electrode. The electrochemical device may be specifically a battery, a capacitor, or the like, and more specifically, may be a lithium secondary battery.

Specifically, the lithium secondary battery includes a positive electrode, a negative electrode positioned to face the positive electrode, a separator interposed between the positive electrode and the negative electrode, and an electrolyte. The positive electrode is the same as that described above, and thus, a detailed description thereof will be omitted. Hereinafter, only the rest of the components will be described in detail.

Also, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 µm to 500 µm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component for assisting in bonding between a conductive material, an active material, and a current collector, and is typically added in an amount of 0.1 wt % to 10 wt % based on a total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, poytetrafluoroethylene, polyethylene, polypropylene, an ethylenepropylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 wt % or less, preferably 5 wt % or less, based on a total weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; fluorocarbon powder; metal powder such as aluminum powder, and nickel powder; a conductive whisker such as zinc oxide and potassium titanate; a conductive metal oxide such as titanium oxide; or a conductive material such as a polyphenylene derivative, and the like may be used.

For example, the negative electrode active material layer may be prepared by applying a negative electrode mixture material, which is prepared by dissolving or dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1 to 5 parts by weight based on a total weight of 100 parts by weight of the electrolyte.

The lithium secondary battery including the positive electrode active material according to the present invention as describe above stably exhibits excellent discharging capacity, output properties, and lifespan properties, and thus, are useful for portable devices such as a mobile phone, a notebook computer, and a digital camera, and in the field of electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

MODE FOR CARRYING OUT THE INVENTION

Hereinafter, the present invention will be described in detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

EXAMPLES

Example 1

A lithium transition metal oxide represented by $LiNi_{0.6}Co_{0.2}Mn_{0.2}O_2$, and carbon black of a hollow structure having the specification of Table 1 below were introduced to a paint shaker (1400 A1 classic shaker, Red Devil Co., Ltd) and then mixed for 60 minutes such that the carbon black was 1 wt % based on 500 g of the lithium transition metal oxide so as to uniformly disperse the transition metal oxide and the carbon black of a hollow structure.
The above mixture was introduced into a mechanofusion device (nobilta, Hosokawa Micron Co., Ltd), and then treated for 10 minutes at 3,000 rpm to produce a positive electrode active material in which a carbon coating layer having a thickness of 200 nm is formed on the lithium transition metal oxide.

Example 2

A positive electrode active material in which a carbon coating layer having a thickness of 250 nm is formed on the lithium transition metal oxide was produced in the same manner as in Example 1 except that mixing was performed such that the carbon black was 1 wt % based on 200 g of the lithium transition metal oxide.

Example 3

A positive electrode active material in which a carbon coating layer having a thickness of 250 nm is formed on the lithium transition metal oxide was produced in the same manner as in Example 1 except that mixing was performed such that the carbon black was 1 wt % based on 100 g of the lithium transition metal oxide.

Example 4

A positive electrode active material in which a carbon coating layer having a thickness of 250 nm is formed on the lithium transition metal oxide was produced in the same manner as in Example 1 except that mixing was performed such that the carbon black was 1 wt % based on 50 g of the lithium transition metal oxide.

Comparative Example 1

A lithium transition metal oxide represented by $LiNi_{0.6}Co_{0.2}Mn_{0.2}O_2$, and carbon black of a hollow structure having the specification of Table 1 below were introduced to a paint shaker (1400 A1 classic shaker, Red Devil Co., Ltd) and then mixed for 60 minutes such that the carbon black was 1 wt % based on 500 g of the lithium transition metal oxide so as to uniformly disperse the transition metal oxide and the carbon black of a hollow structure. As a result, a mixture in which the lithium transition metal oxide and the carbon black were uniformly mixed was produced, which was used as a positive electrode active material.

Comparative Example 2

A lithium transition metal oxide not having a carbon coating layer formed thereon was used as a positive electrode active material.

Comparative Example 3

A mixture in the form in which aggregated carbon black is adsorbed on the surface of the lithium transition metal oxide was produced in the same manner as in Example 2 except that carbon black having the specification of Table 1 below was used.

Comparative Example 4

A mixture in the form in which aggregated carbon black is adsorbed on the surface of the lithium transition metal oxide was produced in the same manner as in Example 1 except that carbon black having the specification of Table 1 below was used.

Comparative Example 5

A mixture in which carbon black and the lithium transition metal oxide are uniformly mixed was produced in the same manner as Comparative Example 1 except that carbon black having the specification of Table 1 below was used, and the mixture was used as a positive electrode active material.

Comparative Example 6

A positive electrode active material in which a carbon coating layer having a thickness of 350 nm is formed on the lithium transition metal oxide was produced in the same manner as in Example 1 except that carbon black having the specification of Table 1 below was used.

TABLE 1

| | Specific surface area ($m^2/g$) | Graphitization degree ($I_D/I_G$) | DBP absorption (mL/100 g) | Size of primary particle (nm) |
|---|---|---|---|---|
| Example 1 | 1,300 | 1.0 | 500 | 50 |
| Example 2 | 1,300 | 1.0 | 500 | 50 |
| Example 3 | 1,300 | 1.0 | 500 | 50 |
| Example 4 | 1,300 | 1.0 | 500 | 50 |
| Comparative Example 1 | 1,300 | 1.0 | 500 | 50 |
| Comparative Example 2 | — | — | — | — |
| Comparative Example 3 | 70 | 1.0 | 90 | 40 |
| Comparative Example 4 | 70 | 1.0 | 90 | 40 |
| Comparative Example 5 | 70 | 1.0 | 90 | 40 |
| Comparative Example 6 | 900 | 1.0 | 250 | 200 |

Experimental Example 1

(1) Identification of Surface Properties of Positive Electrode Active Material

The surface properties of the positive electrode active material of each of Example 1 and Comparative Examples 1, 2, 4, and 6 were confirmed, and are shown in FIGS. 3 to 6.

Figure 3A:
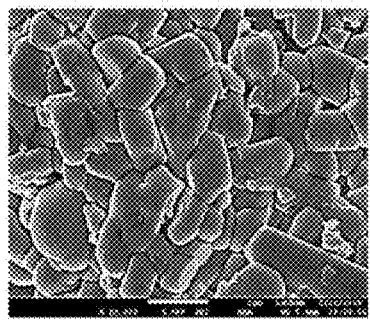
FIG. 3A is an SEM image showing the surface of the positive electrode active material of Comparative Example 2.
Figure 3B:
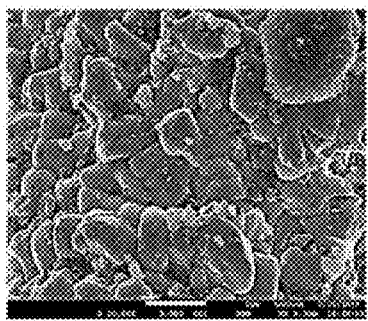
FIG. 3B is an SEM image showing the surface of the positive electrode active material of Comparative Example 1.
Figure 3C:
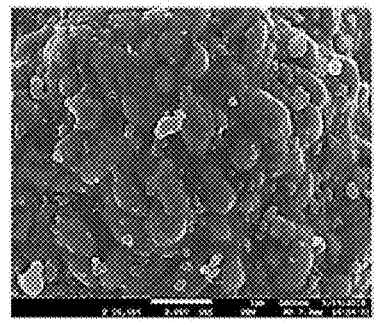
FIG. 3C is an SEM image showing the surface of the positive electrode active material of Example 1.

First, FIGS. 3A to 3C are SEM images showing the surface of the positive electrode active material of Comparative Example 2 (FIG. 3A), the positive electrode active material of Comparative Example 1 (FIG. 3B), and the positive electrode active material of Example 1 (FIG. 3C). At this time, Comparative Example 2 (FIG. 3A) is the positive electrode active material not having a coating layer formed on the surface thereof, and compared to Comparative Example 2, in the case of the positive electrode active material of Example 1, it was confirmed that a carbon-based coating layer was uniformly coated on the surface of the lithium transition metal oxide (the shape in which the surface of a particle is covered with a film of a gray shade in FIG. 3C). On the other hand, in the case of the positive electrode active material produced in Comparative Example 1, it can be confirmed that residues of a carbon particle were present in the form of being adhered on the surface thereof).

Figure 4:
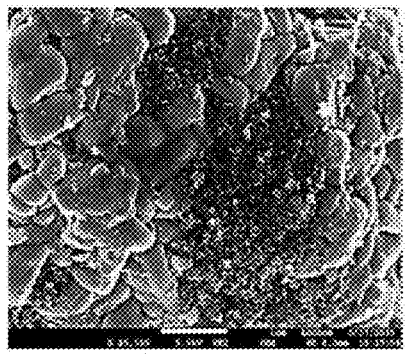
FIG. 4 is an SEM image showing the surface of the positive electrode active material of Comparative Example 4.

Meanwhile, FIG. 4 is SEM images showing the surface of the positive electrode active material of Comparative Example 4. As shown in FIG. 4, when carbon black of a dense structure was coated, it was confirmed that even when a carbon coating layer was formed in a mechanofusion manner, carbon particles were not uniformly coated on the surface of a particle, but adhered at the boundary of primary particles in an aggregated form.

Figure 5:
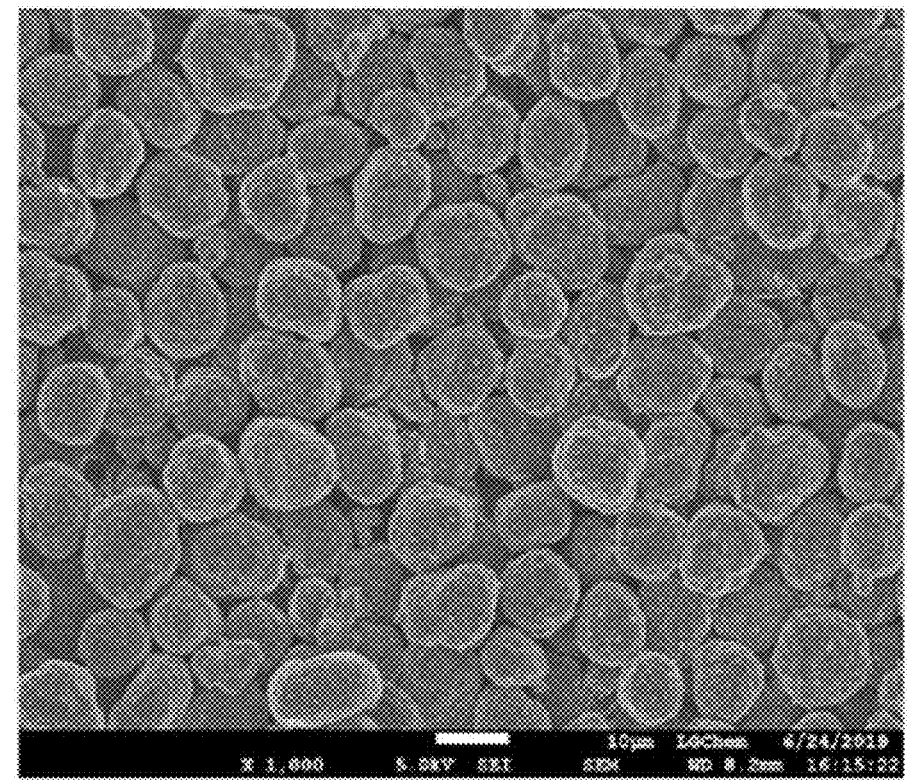
FIG. 5 is an SEM image showing the surface of the positive electrode active material produced in Example 1.
Figure 6:
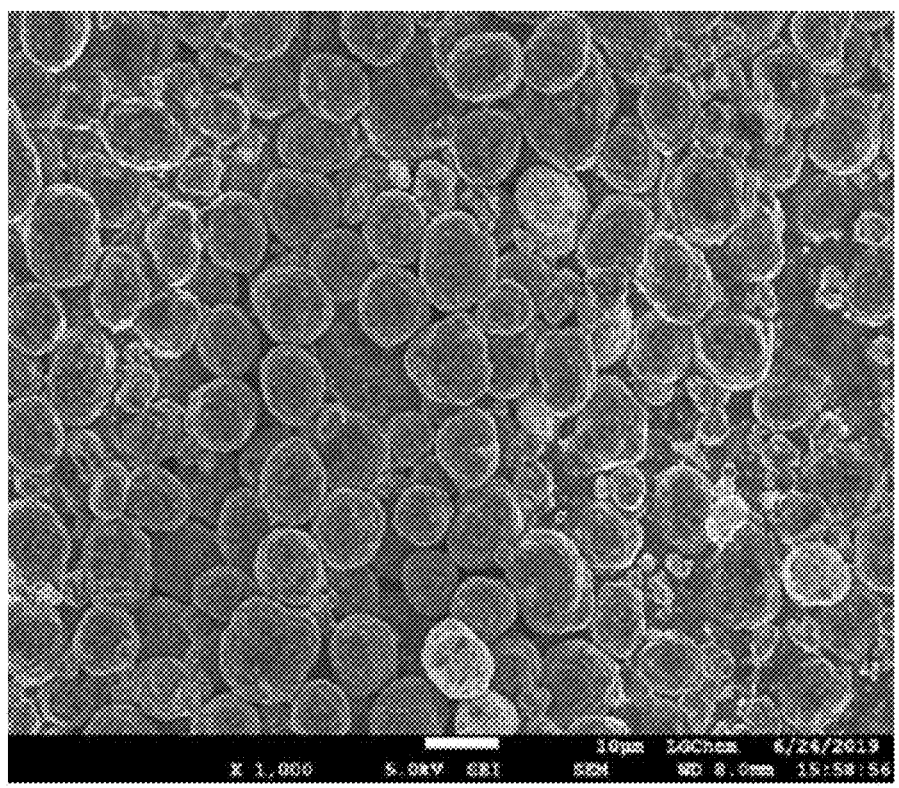
FIG. 6 is an SEM image showing the surface of the positive electrode active material produced in Comparative Example 6.

In addition, FIG. 5 is a SEM image of the surface of the positive electrode active material of Example 1, and FIG. 6 is a SEM image of the surface of the positive electrode active material of Comparative Example 6. As shown in FIG. 5, when carbon black satisfying all of the shape, specific surface area, graphitization degree, and DBP absorption of the present invention was used, it was confirmed that a carbon coating layer was uniformly formed on the surface. On the other hand, as shown in FIG. 6, when the shape, specific surface area, graphitization degree, or DBP absorption of the present invention is not satisfied, it was confirmed that a carbon coating layer was not uniformly formed (white parts of FIG. 6).

(2) Powder Electrical Conductivity of Positive Electrode Active Material (S/cm)

5 g of the positive electrode active material produced in each of Examples 1 to 4 and Comparative Examples 1 to 6 was put into a holder, and then was roll-pressed by a force of 30 kN applied thereto. Using 4 detection ring electrodes for powder only (Mitsubishi Chemical, powder resistance system (MCP=PD51)), the powder electrical conductivity of each of the positive electrode active materials was measured, and the results are shown in Table 2 below.

(3) BET Specific Surface Area

The specific surface area of the positive electrode active material of each of Examples 1 to 4 and Comparative Examples 1 to 6 was measured by a BET method. Specifically, the specific surface area thereof was calculated from the adsorption amount of nitrogen gas under a liquid nitrogen temperature (77 K) using Belsorp-mino II of BEL Japan Co., Ltd, and the results are shown in Table 2.

TABLE 2

| | Electrical conductivity (S/cm) | Specific surface area ($m^2/g$) |
|---|---|---|
| Example 1 | $8.21 \times 10^{-3}$ | 5.98 |
| Example 2 | $6.96 \times 10^{-3}$ | 5.89 |
| Example 3 | $5.73 \times 10^{-3}$ | 4.58 |
| Example 4 | $4.82 \times 10^{-3}$ | 3.42 |
| Comparative Example 1 | $3.64 \times 10^{-3}$ | 2.56 |
| Comparative Example 2 | $2.17 \times 10^{-3}$ | 0.26 |
| Comparative Example 3 | $2.15 \times 10^{-3}$ | 1.58 |
| Comparative Example 4 | $2.35 \times 10^{-3}$ | 1.66 |
| Comparative Example 5 | $2.44 \times 10^{-3}$ | 1.43 |
| Comparative Example 6 | $5.54 \times 10^{-3}$ | 3.97 |

As shown in Table 2 above, the positive electrode active materials produced in Examples 1 to 5 had improved positive electrode active material powder electrical conductivity compared to Comparative Examples 1 to 5.

Experimental Example 2

Lithium secondary batteries were manufactured using the positive electrode active material produced in each of Examples 1 to 4 and Comparative Examples 1 to 6, and the capacity of each of the lithium secondary batteries including the positive electrode active material of each of Examples 1 to 4 and Comparative Examples 1 to 6 was evaluated.

Specifically, the positive electrode active material produced in each of Examples 1 to 4 and Comparative Examples 1 and 6, a carbon conductive material, and a polyvinylidene fluoride (PVdF) were mixed at a weight ratio of 97.5:1.0:1.5 in a N-methyl-2-pyrrolidone (NMP) solvent to prepare a positive electrode slurry. The positive electrode slurry was applied on one surface of an aluminum current collector, dried at 130° C., and then roll-pressed to manufacture a positive electrode.

Meanwhile, artificial graphite, which was used as a negative electrode active material, a carbon black conductive material, and styrene-butadiene rubber (SBR) and carboxy methyl cellulose (CMC) as binders were mixed at a weight ratio of 96.4:0.5:2.3:1.1 in distilled water to prepare a negative electrode active material slurry. The negative electrode active material slurry was applied on a copper current collector having a thickness of 20 μm, dried, and then roll-pressed to manufacture a negative electrode.

A polyethylene-based separator having a thickness of 15 μm was interposed between the positive electrode and the negative electrode manufactured above to manufacture an electrode assembly, and the electrode assembly was placed inside a battery case. Thereafter, an electrolyte solution was injected into the inside of the case to manufacture a lithium secondary battery. At this time, as the electrolyte solution, an electrolyte solution prepared by dissolving 1 M of $LiPF_6$ in a mixed organic solvent in which ethylene carbonate (EC) and ethyl methyl carbonate (EMC) were mixed in a volume ratio of 1:2 was used to manufacture a lithium secondary battery according to each of Examples 1 to 4 and Comparative Examples 1 to 6.

Next, each of the lithium secondary batteries manufactured in Examples 1 to 4 and Comparative Examples 1 to 6 was charged to 4.25 V with a constant current of 0.2 C. at 25° C. with a cut-off of 0.05 C. Next, each of the lithium secondary batteries was discharged to 2.5 V with a constant current of 0.2 C. to measure initial charge and discharge capacities.

Thereafter, charging was performed with a 0.2 C. constant current to 4.25 V with a 0.05 C. cut off, and then discharging was performed with a 2.0 C. constant current until 2.5 V was reached. The above charge/discharge behavior was set as one cycle, and the cycle was repeated 2 times. Thereafter, the capacity properties at 2.0 C. with respect to 0.2 C. discharge capacity of each of the lithium secondary batteries according to Examples 1 to 4 and Comparative Examples 1 to 6 were measured, and the results are shown in Table 3 below.

TABLE 3

|  | 2.0 C discharge capacity ratio (%, based on 0.2 C discharge capacity) |
| --- | --- |
| Example 1 | 92.7 |
| Example 2 | 90.6 |
| Example 3 | 88.9 |
| Example 4 | 81.3 |
| Comparative Example 1 | 80.1 |
| Comparative Example 2 | 81.5 |
| Comparative Example 3 | 75.3 |
| Comparative Example 4 | 74.9 |
| Comparative Example 5 | 73.6 |
| Comparative Example 6 | 82.8 |

As shown in Table 3 above, it was confirmed that the capacity properties of the secondary batteries of Examples 1 to 4 were superior to those of the secondary batteries of Comparative Examples 1 to 5. Meanwhile, the capacity properties of the secondary battery of Comparative Example 6 were significantly inferior to those of Example 1 in which a lithium transition metal oxide of the same weight was used.

The invention claimed is:

1. A method for producing a positive electrode active material, the method comprising:
    initially mixing a lithium transition metal oxide and a carbon-based material having a hollow structure to form a mixture; and
    subsequently mechanically treating the mixture to form a carbon coating layer on the surface of the lithium transition metal oxide,
    wherein the carbon-based material has a chain shape, and has a specific surface area of 500 m$^2$/g or greater, a graphitization degree ($I_D/I_G$) of 1.0 or higher, and a dibutylphthalate (DBP) absorption of 300 mL/100 g or greater.

2. The method of claim 1, wherein the carbon-based material is mixed in an amount of 0.1 to 1.5 parts by weight based on 100 parts by weight of the lithium transition metal oxide.

3. The method of claim 1, wherein the mechanical treating of the mixture is performed by a mechanofusion method.

4. The method of claim 1, wherein the carbon-based material is in the form of secondary particles, where a secondary particle is an aggregate of primary particles.

5. The method of claim 4, wherein the size of the primary particles of the carbon-based material is 50 nm or less.

6. The method of claim 1, wherein the specific surface area is 500 m$^2$/g to 2,500 m$^2$/g.

7. The method of claim 1, wherein the c$I_D/I_G$ is 1.0 to 2.0.

8. The method of claim 1, wherein the DBP absorption is 300 mL/100 g to 2,000 mL/100 g.

9. The method of claim 1, further comprising passing the mixture to a mechanofusion device before mechanically treating the mixture to form a carbon coating layer on the surface of the lithium transition metal oxide.

* * * * *